United States Patent
Shen

(10) Patent No.: US 12,304,630 B2
(45) Date of Patent: May 20, 2025

(54) AERIAL ELECTROSTATIC SPRAYING DEVICE CAPABLE OF AIR-IONIZATION GROUNDING

(71) Applicant: TAICANG JINGANG PLANT PROTECTION EQUIPMENT TECHNOLOGY CO., LTD, Jiangsu (CN)

(72) Inventor: Weiguo Shen, Suzhou (CN)

(73) Assignee: Taicang Jingang Plant Protection Equipment Technology Co., Ltd., Jiangsu (CN)

( * ) Notice: Subject to any disclaimer, the term of this patent is extended or adjusted under 35 U.S.C. 154(b) by 37 days.

(21) Appl. No.: 17/790,981

(22) PCT Filed: May 25, 2021

(86) PCT No.: PCT/CN2021/095638
§ 371 (c)(1),
(2) Date: Jul. 6, 2022

(87) PCT Pub. No.: WO2022/246622
PCT Pub. Date: Dec. 1, 2022

(65) Prior Publication Data
US 2024/0174358 A1    May 30, 2024

(51) Int. Cl.
*B64D 1/18* (2006.01)
*B05B 5/00* (2006.01)

(52) U.S. Cl.
CPC . *B64D 1/18* (2013.01); *B05B 5/00* (2013.01)

(58) Field of Classification Search
CPC .................................. B64D 1/18; B05B 5/00
USPC .............................. 239/171, 690, 695, 708
See application file for complete search history.

(56) References Cited

U.S. PATENT DOCUMENTS

| | | | | |
|---|---|---|---|---|
| 4,560,107 A | * | 12/1985 | Inculet | B64D 1/16 239/3 |
| 4,703,891 A | * | 11/1987 | Jackson | B05B 5/0535 239/691 |
| 2014/0151471 A1 | * | 6/2014 | Dau | B05B 5/0255 239/690 |

\* cited by examiner

*Primary Examiner* — Christopher S Kim
(74) *Attorney, Agent, or Firm* — Ming Jiang; OPENPTO US LLC

(57) ABSTRACT

An aerial electrostatic spraying device capable of air-ionization grounding is provided, which relates to the technical field of electrostatic spraying. The spraying device includes an aircraft, and following components installed on the aircraft: a liquid storage tank, a water pump, a high-voltage electrostatic generator, a charging electrode, an air-ionization grounding electrode, a spraying rod, spraying heads, nozzles, and an electric control switch.

10 Claims, 1 Drawing Sheet

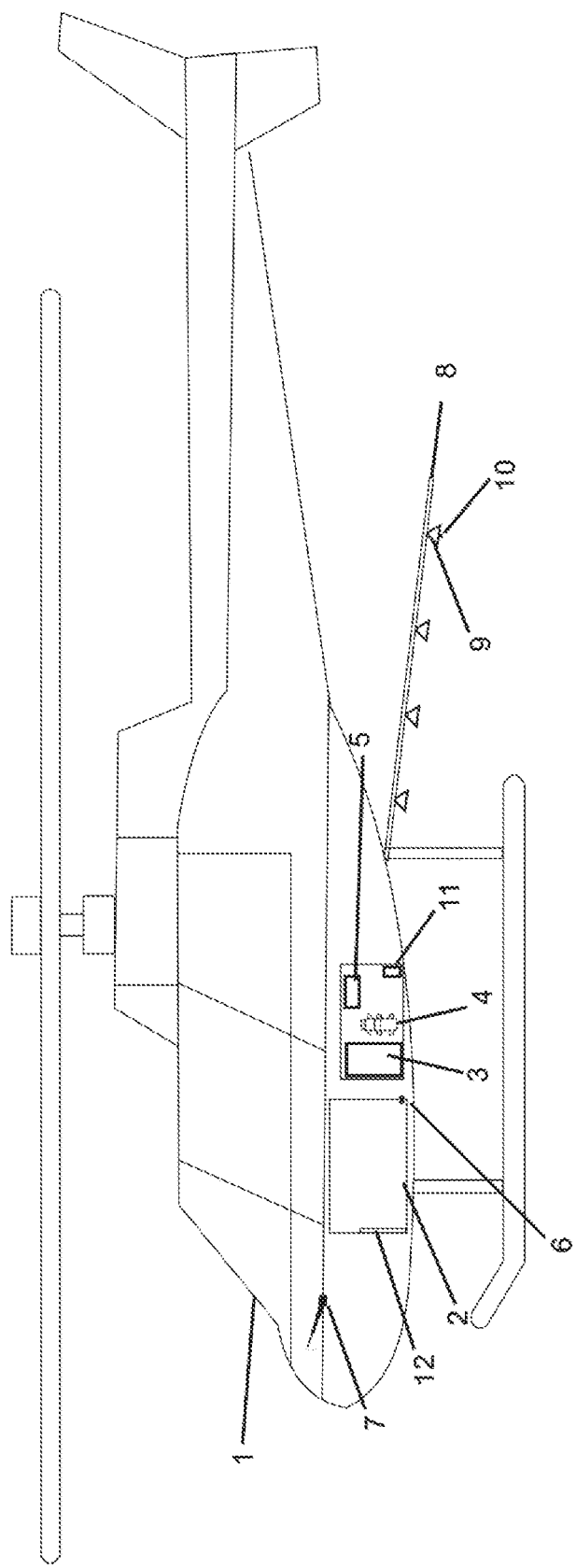

AERIAL ELECTROSTATIC SPRAYING DEVICE CAPABLE OF AIR-IONIZATION GROUNDING

CROSS REFERENCE TO RELATED APPLICATION

This patent application is a national stage application of International Patent Application No. PCT/CN2021/095638 filed on May 25, 2021, the disclosure of which is incorporated by reference herein in its entirety as part of the present application.

TECHNICAL FIELD

The present disclosure relates to the technical field of electrostatic spraying, more specifically, relates to an aerial electrostatic spraying device capable of air-ionization grounding.

BACKGROUND ART

Aerial spraying has a series of advantages such as water saving, pesticide saving and high efficiency, which can play an active role in the field of agricultural plant protection. However, common aerial spraying also has many defects and shortcomings such as serious drift of droplets, environmental pollution, a low adhesion rate of the droplets on the back surfaces of the plant and unsatisfactory adsorption effect. which leads to influence on the control efficacy of aerial spraying, and therefore needs to be improved and enhanced.

SUMMARY

For the shortcomings in the prior art, a purpose of the present disclosure is to provide an aerial electrostatic spraying device capable of air-ionization grounding, which can effectively reduce drift of droplets, improve an adhesion rate of droplets on the target object, improve a control efficacy, and reduce phytotoxicity and environmental pollution.

The technical purpose of the present disclosure is achieved through the following technical solutions.

An aerial electrostatic spraying device capable of air-ionization grounding, includes an aircraft, and a liquid storage tank, a storage battery, a water pump, a high-voltage electrostatic generator, a charging electrode, an air-ionization grounding electrode, a spraying rod, spraying heads, nozzles and an electric control switch which are installed on the aircraft.

The liquid storage tank is configured for storing a disinfectant solution. The water pump is connected to the liquid storage tank and the spraying rod by means of pipelines, the spraying heads are installed on the spraying rod, and each of the nozzles is installed on a corresponding one of the spraying heads. The high-voltage electrostatic generator is configured for charging the disinfectant solution. The charging electrode is electrically connected to one of a positive voltage output column and a negative voltage output column of the high-voltage electrostatic generator by means of a first cable. The charging electrode is arranged in the liquid storage tank and configured to be located below a liquid surface of the disinfectant solution; and the air-ionization grounding electrode is electrically connected to an other one of the positive voltage output column and the negative voltage output column of the high-voltage electrostatic generator by means of a second cable.

In some embodiments, the liquid storage tank may be of a blow-molding integrated structure and is installed on a support of the aircraft.

In some embodiments, the storage battery, the water pump and the high-voltage electrostatic generator may be installed on a support at one side of the liquid storage tank. Insulated and isolated components may be provided among the storage battery, the water pump and the high-voltage electrostatic generator. Or the storage battery, the water pump and the high-voltage electrostatic generator may be installed in an insulated box made of an insulating material. The insulated box may be installed on the support at one side of the liquid storage tank, and may be connected to the aircraft by means of an insulated connecting component. A drain hole or a drain pipe may be provided at a suspended portion, which may dodge the aircraft, of the insulated box to drain accumulated liquid from the insulated box.

In some embodiments, the aerial electrostatic spraying device may further include an insulated housing which may be provided with a cavity. The high-voltage electrostatic generator may be arranged in the cavity of the insulated housing, and epoxy resin may be filled between the high-voltage electrostatic generator and the insulated housing for sealing and packaging.

In some embodiments, the charging electrode may include a first elongate cylinder made of a brass material and a second elongate cylinder made of a stainless-steel material which may be tightly assembled and spliced together. A rubber wrapping layer may be arranged outside the first elongate cylinder in the charging electrode, and the second elongate cylinder may be exposed and inserted into a bottom of the liquid storage tank. One end of the first elongate cylinder may be electrically connected to an end of a high-voltage-resistant wire, and an other end of the high-voltage-resistant wire may be electrically connected to one pole of a high-voltage output terminal of the high-voltage electrostatic generator.

In some embodiments, an electrostatic energy storage device may be further arranged in the liquid storage tank. The electrostatic energy storage device may be formed by coating a metallic paint or bonding metal sheets on an inner wall of the liquid storage tank for enabling the electrostatic energy storage device to have a capacitance energy storage function.

In some embodiments, the air-ionization grounding electrode may include an automatic induction telescopic adjusting device. A free end of the air-ionization grounding electrode may be a tip which may be extended downwards or upwards; and the air-ionization grounding electrode may be installed at a head of the aircraft.

In some embodiments, the water pump may be a reflux diaphragm pump that may be insulated and isolated, and a shell of the reflux diaphragm pump may be a plastic totally-enclosed shell.

In some embodiments, the spraying rod may be arranged at a tail end of the aircraft and may extend towards the tail end in a length direction of the aircraft. The spraying heads may be evenly distributed at a bottom of the spraying rod, each of the spraying heads may be provided with one of the nozzles which may be a hydraulic nozzle or a centrifugal nozzle.

In some embodiments, the electric control switch may be a manual switch and/or a remote-control switch.

In some embodiments, the storage battery may employ an independent special battery, or share one power supply together with a flight control part on the aircraft by means of a fully-isolated convert device, so as to effectively eliminate the interaction between flight control and electrostatic spraying.

In conclusion, the embodiments have the following beneficial effects.

The aerial electrostatic spraying device capable of air-ionization grounding provided by the present disclosure can effectively enhance the adhesion rate of sprayed droplets on the front and back surfaces of the plant, enhance the adsorption efficiency and reduce the drift of droplets, thus reducing the environmental pollution and prevent phytotoxicity from generating. By adopting the air-ionization grounding, a phenomenon of mutual cancellation caused by mutual cross-twisting of different polarities of charged droplets in the air can be effectively eliminated, and one polarity of electrostatic charge can be smoothly conducted to the target object on the ground, thereby ensuring an excellent surrounding adsorption effect (i.e., a stereoscopic effect that electrostatic charge droplets adsorb on all outer surfaces of the target object) of the aerial electrostatic spraying.

BRIEF DESCRIPTION OF THE DRAWINGS

To illustrate the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 1 is a schematic structural diagram of an aerial electrostatic spraying device capable of air-ionization grounding in accordance with an embodiment of the present disclosure.

List of the reference characters: 1 aircraft; 2 liquid storage tank; 3 storage battery; 4 water pump; 5 high-voltage electrostatic generator; 6 charging electrode; 7 air-ionization grounding electrode; 8 spraying rod; 9 spraying head; 10 nozzle; 11 electric control switch; 12 electrostatic energy storage device.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

A purpose of the present embodiments is to provide an aerial electrostatic spraying device capable of air-ionization grounding to solve the problems in the prior art.

To make the purpose, features and advantages of the present disclosure more apparent and understandable, the following is a further detailed description of the present disclosure with reference to the accompanying drawings and specific embodiments.

As shown in FIG. 1, the aerial electrostatic spraying device includes an aircraft 1 and a liquid storage tank 2, a storage battery 3, a water pump 4, a high-voltage electrostatic generator 5, a charging electrode 6, an air-ionization grounding electrode 7, a spraying rod 8, spraying heads 9, nozzles 10 and an electric control switch 11 which are installed on the aircraft 1.

The liquid storage tank 2 is used for storing a disinfectant solution. The water pump 4 is connected to the liquid storage tank 2 and the spraying rod 8 by means of pipelines, the spraying heads 9 are installed on the spraying rod 8, and each of the nozzles 10 is installed on a corresponding one of the spraying heads 9. The high-voltage electrostatic generator 5 is used for charging the disinfectant solution. The charging electrode 6 is electrically connected to one of a positive voltage output column and a negative voltage output column of the high-voltage electrostatic generator 5 by means of a first cable. The charging electrode 6 is arranged in the liquid storage tank 2 and used to be located below a liquid surface of the disinfectant solution. The air-ionization grounding electrode is electrically connected to an other one of the positive voltage output column and the negative voltage output column of the high-voltage electrostatic generator 5 by means of a second cable.

In a specific embodiment of the present disclosure, the liquid storage tank 2 is of a blow-molding integrated structure and is installed on a support of the aircraft 1. The integrated liquid storage tank 2 has a higher sealing property and an insulating property, thus improving the safety of the spraying device.

In a specific embodiment of the present disclosure, the storage battery 3, the water pump 4 and the high-voltage electrostatic generator 5 are installed on a support at one side of the liquid storage tank 2. Insulated isolated components are provided among the storage battery 3, the water pump 4 and the high-voltage electrostatic generator 5. The insulated and isolated components can effectively insulate and isolate the storage battery 3, the water pump 4 and the high-voltage electrostatic generator 5 from one another, and insulate and isolate the storage battery 3, the water pump 4 and the high-voltage electrostatic generator 5 from the aircraft. In this way, electric leakage is prevented, an electrostatic charging effect of liquid pesticide is improved, and safety performance of the spray device is improved. The storage battery 3, the water pump 4 and the high-voltage electrostatic generator 5 may also be installed in an insulated box or an insulated bin made of an insulating material, and the insulated box or the insulated bin is installed on the support at one side of the liquid storage tank. Above components are installed in the insulated bin, and the insulated bin is further connected to the aircraft by using an insulated connecting component. Furthermore, a drain hole or a drain pipe is provided on a suspended portion, which dodges the aircraft, of the insulated bin, so as to drain accumulated liquid from the insulated bin without polluting the aircraft. The arrangement of the insulated bin can further improve the overall insulating and safety performance and prevent the hidden risks caused by accidental breakage of the liquid storage tank and electrostatic leakage.

In a specific embodiment of the present disclosure, in order to protect the high-voltage electrostatic generator 6 and enhance the safety protection level, the spraying device further includes an insulated housing which is provided with a cavity, and the high-voltage electronic generator 6 is arranged in the cavity of the insulated housing. In order to further enhance the safety and waterproof level of the high-voltage electrostatic generator 6, epoxy resin is filled between the high-voltage electrostatic generator 6 and the insulated housing for sealing and packaging.

In a specific embodiment of the present disclosure, the charging electrode 6 includes an elongate cylinder made of a brass material and an elongate cylinder made of a stainless-steel material which are tightly assembled and spliced together (hereinafter referred to as a stainless-steel cylinder and a brass cylinder). For example, counter bores are machined at one of a first end of the stainless-steel cylinder and a second end of the brass cylinder, cylindrical protrusions in over-tight fit with the counter bores are machined at another one of the first end and the second end, and the first end and the second end are connected with each other. Then, the stainless-steel cylinder and the brass cylinder are tightly assembled together in a nesting mode. Or the stainless-steel cylinder and the brass cylinder are connected by a screw hole and a screw rod, and then a locking nut and a spring gasket are additionally provided for locking. The purpose is to make the stainless-steel cylinder and the brass cylinder to be connected into a whole with excellent electric connection.

Further, a rubber wrapping layer is arranged outside the brass cylinder in the charging electrode 6, and the stainless-steel cylinder is exposed and inserted into a bottom of the liquid storage tank. One end of the brass cylinder is electrically connected to an end of high-voltage-resistant wire, and an other end of the high-voltage-resistant wire is electrically connected to one pole of a high-voltage output terminal of the high-voltage electrostatic generator. The stainless-steel has corrosion-resistant properties, so as to be in contact with the liquid pesticide for long-term normal conductive work. The one end of the brass cylinder of the charging electrode is connected with the end of high-voltage-resistant wire by tin welding.

In an embodiment, in order to enhance the electrostatic charging efficiency and effect, an electrostatic energy storage device 12 is further arranged in the liquid storage tank. The electrostatic energy storage device is formed by coating a metallic paint or bonding metal sheets on an inner wall of the liquid storage tank to enable the electrostatic energy storage device to have a capacitance energy storage function, and thus the electrostatic charging efficiency and effect can be further improved.

In a specific embodiment of the present disclosure, the air-ionization grounding electrode 7 includes an automatic induction telescopic adjusting device. The automatic induction telescopic adjusting device employs an existing electric telescopic principle, and infrared ranging is adopted by a tip of the adjusting device. By setting a distance through a control system, a distance between the tip and the target object is adjusted by means of the infrared ranging and electric telescopic. The free end of the air-ionization grounding electrode 7 is the tip which is extended downward or upward. Therefore, the discharging tip of the air-ionization grounding electrode 7 can be maximally close to the target object and dodge charged droplets sprayed out, thus increasing the effect of air-ionization discharge grounding. The air-ionization grounding electrode 7 extends towards the ground, such that the free end of the air-ionization grounding electrode is close to the ground or the target object (i.e., the plant needing liquid pesticide spraying). The free end may be a tip or in an umbrella rib shape. The air between the ground or the target object and the air-ionization grounding electrode 7 is ionized by means of a high voltage to achieve the electric connection between the air-ionization grounding electrode and the ground. Finally, a current loop is formed among the air-ionization grounding electrode 7, the ground, the charged and atomized liquid pesticide, the charging electrode 6 and the high-voltage electrostatic generator 5.

Specifically, the air-ionization grounding electrode 7 is installed at a head of the aircraft 1, and a direction of the air-ionization grounding electrode can be changed and adjusted. The air-ionization grounding electrode may be extended downwards or upwards. The air-ionization grounding electrode may also be installed at an upper portion of the aircraft. Thus, the charged and atomized liquid pesticide does not come into contact with the air-ionization grounding electrode 7, and the charge neutralization is avoided.

In a specific embodiment of the present disclosure, the water pump 4 is a reflux diaphragm pump that is insulated and isolated, and a shell of the reflux diaphragm pump is a plastic totally-enclosed shell. The shell is totally enclosed with the plastic to avoid electrostatic high voltage leakage.

In a specific embodiment of the present disclosure, the spraying rod 8 is arranged at a tail end of a lower portion of the aircraft 1 and extends towards the tail end in a length direction of the aircraft 1. The spraying heads 9 are evenly distributed at a bottom of the spraying rod 8. Each of the spraying heads 9 is provided with one of the nozzles 10, and the nozzles 10 are hydraulic nozzles or centrifugal nozzles, so as to adapt to the demands of different spraying environments.

Further, the electric control switch 11 is a manual switch and/or a remote-control switch. The electric control switch 11 is designed to be selectable in dual functions of manual operation and remote control, so as to adapt to the control demands of various different aircrafts.

Further, the storage battery 3 employs an independent special battery, or shares one power supply with a flight control part on the aircraft 1 by a fully-isolated convert device, so as to effectively eliminate interaction between the flight control and the electrostatic spraying.

During specific implementation, when the aircraft 1 takes off to an operating position, the electric control switch 11 is started, and the storage battery 3 supplies power to the water pump 4 and the high-voltage electrostatic generator 5. After the high-voltage electrostatic generator 5 operates, positive high-voltage static electricity and negative high-voltage static electricity are respectively output from the high-voltage output terminal and then are respectively transmitted to the charging electrode 6 in direct contact with the liquid and the air-ionization grounding electrode 7 by means of the high-voltage-resistant wires. Therefore, the charging electrode 6 in direct contact with the liquid makes the liquid in the liquid storage tank carry one polarity of electrostatic charge. The air-ionization grounding electrode 7 discharges electricity to the air to make local air be ionized, so as to carry other polarity of electrostatic charge. Then, the other polarity of electrostatic charge is conducted by means of the air to make the target object on the nearby ground to carry this polarity of electrostatic charge. After the water pump 4 operates, the charged liquid in the liquid storage tank 2 is pumped into a pump chamber by a liquid inlet hose to be pressurized, and then is extruded or centrifugally atomized and sprayed out from the nozzle 10 by means of a liquid outlet hose. When the sprayed charged droplets are deposited near the target object carrying the one polarity of electrostatic charge under the multiple actions of external force pushing, gravitational attraction and electric field force, the sprayed charged droplets can be firmly adsorbed on the upper, lower, left and right surfaces of the target object under the mutual attraction effect of opposite charges, thus achieving the excellent surrounding adsorption effect of electrostatic spraying. Therefore, the drift of the droplets can be effectively reduced, the adhesion rate of the droplets on the target object is improved, the control efficacy is improved, and phytotoxicity and environmental pollution are reduced.

Specific examples are used for illustration of the principles and implementations of the present disclosure. The description of the above embodiments is merely used to help illustrate the method and its core idea of the present invention. In addition, a person of ordinary skill in the art can make various modifications in terms of specific implementations and scope of application in accordance with the teachings of the present disclosure. In conclusion, the content of this specification shall not be construed as a limitation to the present disclosure.

What is claimed is:

1. An aerial electrostatic spraying device capable of air-ionization grounding, the aerial electrostatic spraying device comprising an aircraft, and a liquid storage tank, a storage battery, a water pump, a high-voltage electrostatic generator, a charging electrode, an air-ionization grounding electrode, a spraying rod, spraying heads, nozzles and an electric control switch which are installed on the aircraft;

wherein the liquid storage tank is configured for storing a disinfectant solution; the water pump is connected to the liquid storage tank and the spraying rod by means of pipelines, the spraying heads are installed on the spraying rod, and each of the nozzles is installed on a corresponding one of the spraying heads; the high-voltage electrostatic generator is configured for charging the disinfectant solution; the charging electrode is electrically connected to one of a positive voltage output column and a negative voltage output column of the high-voltage electrostatic generator by means of a first cable; the charging electrode is arranged in the liquid storage tank and configured to be located below a liquid surface of the disinfectant solution; and the air-ionization grounding electrode is electrically connected to an other one of the positive voltage output column and the negative voltage output column of the high-voltage electrostatic generator by means of a second cable.

2. The aerial electrostatic spraying device capable of air-ionization grounding according to claim 1, wherein the liquid storage tank is of a blow-molding integrated structure and is installed on a support of the aircraft.

3. The aerial electrostatic spraying device capable of air-ionization grounding according to claim 1, wherein the storage battery, the water pump and the high-voltage electrostatic generator are installed on a support at one side of the liquid storage tank, insulated and isolated components are provided among the storage battery, the water pump and the high-voltage electrostatic generator; or the storage battery, the water pump and the high-voltage electrostatic generator are installed in an insulated box made of an insulating material; the insulated box is installed on the support at one side of the liquid storage tank, and is connected to the aircraft by means of an insulated connecting component; a drain hole or a drain pipe is provided at a suspended portion, which dodges the aircraft, of the insulated box to drain accumulated liquid from the insulated box.

4. The aerial electrostatic spraying device capable of air-ionization grounding according to claim 3, wherein the aerial electrostatic spraying device further comprises an insulated housing which is provided with a cavity; the high-voltage electrostatic generator is arranged in the cavity of the insulated housing, and epoxy resin is filled between the high-voltage electrostatic generator and the insulated housing for sealing and packaging.

5. The aerial electrostatic spraying device capable of air-ionization grounding according to claim 1, wherein the charging electrode comprises a first elongate cylinder made of a brass material and a second elongate cylinder made of a stainless-steel material which are tightly assembled and spliced together; a rubber wrapping layer is arranged outside the first elongate cylinder in the charging electrode, and the second elongate cylinder is exposed and inserted into a bottom of the liquid storage tank; one end of the first elongate cylinder is electrically connected to an end of a high-voltage-resistant wire, and an other end of the high-voltage-resistant wire is electrically connected to one pole of a high-voltage output terminal of the high-voltage electrostatic generator.

6. The aerial electrostatic spraying device capable of air-ionization grounding according to claim 1, wherein an electrostatic energy storage device is further arranged in the liquid storage tank; and the electrostatic energy storage device is formed by coating a metallic paint or bonding metal sheets on an inner wall of the liquid storage tank for enabling the electrostatic energy storage device to have a capacitance energy storage function.

7. The aerial electrostatic spraying device capable of air-ionization grounding according to claim 1, wherein the air-ionization grounding electrode comprises an automatic induction telescopic adjusting device; a free end of the air-ionization grounding electrode is a tip which is extended downwards or upwards; and the air-ionization grounding electrode is installed at a head of the aircraft.

8. The aerial electrostatic spraying device capable of air-ionization grounding according to claim 1, wherein the water pump is a reflux diaphragm pump that is insulated and isolated, and a shell of the reflux diaphragm pump is a plastic totally-enclosed shell.

9. The aerial electrostatic spraying device capable of air-ionization grounding according to claim 1, wherein the spraying rod is arranged at a tail end of the aircraft and extends towards the tail end in a length direction of the aircraft; the spraying heads are evenly distributed at a bottom of the spraying rod, each of the spraying heads is provided with one of the nozzles which is a hydraulic nozzle or a centrifugal nozzle.

10. The aerial electrostatic spraying device capable of air-ionization grounding according to claim 1, wherein the electric control switch is a manual switch and/or a remote-control switch.

* * * * *